Sept. 3, 1963

R. P. PEARSON 3,103,002

CAPACITIVE FLUID LEVEL SENSING APPARATUS

Filed Dec. 28, 1959

INVENTOR
ROBERT P. PEARSON

BY *Charles J. Ungemach*

ATTORNEY

Sept. 3, 1963   R. P. PEARSON   3,103,002
CAPACITIVE FLUID LEVEL SENSING APPARATUS
Filed Dec. 28, 1959   2 Sheets-Sheet 2

INVENTOR
ROBERT P. PEARSON
BY Charles J. Engemach
ATTORNEY

3,103,002
CAPACITIVE FLUID LEVEL SENSING APPARATUS

Robert P. Pearson, Roseville, Minn., assignor to Minneapolis-Honeywell Regulator Company, Minneapolis, Minn., a corporation of Delaware
Filed Dec. 28, 1959, Ser. No. 862,221
13 Claims. (Cl. 340—244)

This invention is concerned with condition sensing apparatus and more particularly with a capacitive type fluid level sensor for use in a system to detect the presence or absence of a fluid at a predetermined level in a container.

The capacitor of this invention is particularly adapted for use in a level switching circuit such as is disclosed in a patent of mine, 3,042,908, issued July 3, 1962, which is assigned to the assignee of the present invention. The capacitor sensor of the present invention is a small, lightweight, centrally supported capacitor having a small displacement between the electrodes and which may be easily and cheaply fabricated and readily mounted in the container of fluid to be measured. Briefly the capacitor comprises an elongated centrally mounted rod supporting a plurality of capacitor electrodes. The supporting rod is conductive and when used in a system is connected to a reference potential such as ground. The capacitor electrodes are insulated from the rod each by a pair of insulators to which the electrodes are fastened. With such a construction a single mechanical connection exists between the capacitor electrodes. Because the capacitive electrodes must occupy a minimum vertical displacement for most accurate operation, the problem of fluid adhering to the insulators by surface tension has become apparent. The adhering fluid may be partly conductive and may so adhere to the insulators that a resistive path is created between the electrodes after the fluid in the container has fallen below the sensor. This problem has been overcome by inclusion of an abutting washer or conductive member connected to the supporting rod and located intermediate the two electrodes on the mounting structure. This conductor is thus at ground potential and any adhesion of fluid exists between the individual electrodes and ground rather than across the capacitor.

A more complete understanding of the invention will be obtained by reference to the specifications, claims and drawings in which:

Figure 1:
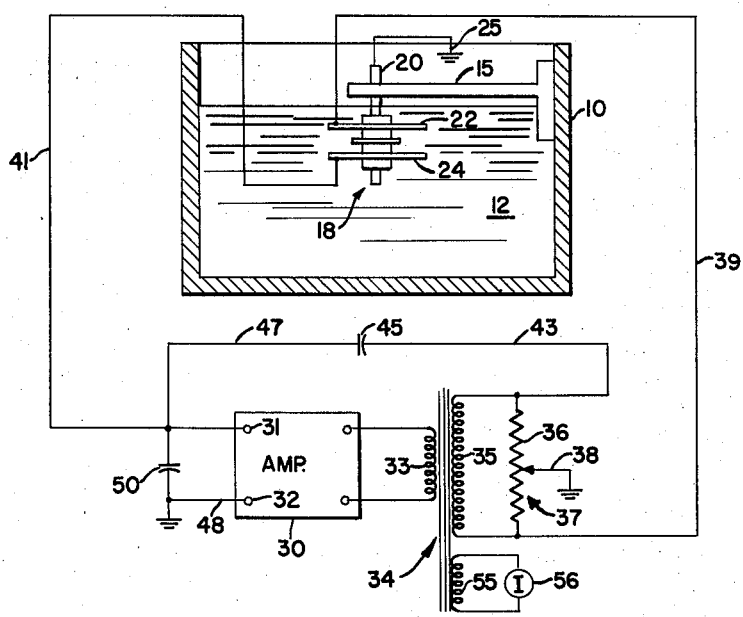
FIGURE 1 is a schematic representation showing a circuit in which the capacitor of the present invention may be employed.

Referring to FIGURE 1, a container 10 is shown in which a fluid 12 is contained. Mounted in container 10 by any suitable means such as a support 15 attached to the container 10 is a capacitive sensor shown generally at 18. The capacitive sensor 18 consists of a central supporting rod 20 and a pair of capacitive electrodes 22 and 24. The central supporting rod 20 may be externally threaded to facilitate mounting of the capacitor on the support 15 and is connected to ground at 25. Capacitor 18 is connected in a fluid sensing system such as that described in the above-mentioned copending application. Briefly, such a system comprises an amplifier 30 having input terminals 31 and 32 and having a primary winding 33 of a transformer 34 connected across the output. Transformer 34 has a first secondary winding 35 across which a resistance winding 36 of potentiometer 37 is connected. Potentiometer 37 has a movable wiper 38 connected to ground or reference potential. Connected to one end of the secondary 35 by conductor 39 is the electrode 22 of the sensing capacitor 18. The other electrode 24 of sensor 18 is connected by a conductor 41 to input terminal 31 of amplifier 30. The other end of transformer secondary 35 is connected by a conductor 43 to one electrode of a reference capacitor 45, the other electrode of which is also connected to the input terminal 31 of amplifier 30 by a conductor 47. The input terminal 32 of amplifier 30 is connected by a conductor 48 to the ground or reference potential and a capacitor 50 is connected between input terminals 31 and 32. A second secondary 55 of transformer 34 has an indicator 56 connected across the two ends.

In operation the reference capacitor 45 and the sensing capacitor 18 are located in opposite arms of a bridge. Since wiper 38 of potentiometer 37 is connected to ground, oppositely phased signals are derived by capacitor 45 and sensor 18. These signals are presented to the input of amplifier 30. By properly setting wiper 38 these signals can be made equal when, for example, the sensor 18 is covered with fluid so that no net feedback to the input of amplifier 30 results. When the fluid in container 10 falls below the level of sensor 18, the capacitance of sensor 18 changes and a positive feedback signal is presented to amplifier 30. Amplifier 30 is then caused to oscillate at which time a sufficient voltage across secondary 55 is derived to operate indicator 56. The capacitor 50 is connected across the input of amplifier 30 to assure that the feedback signal is reactive. When the fluid again rises above the level of sensor 18, the feedback circuit is again balanced, and amplifier 30 stops oscillating. Indicator 56 provides the necessary indication to inform the operator that the fluid is above or below the level of the sensing capacitor.

Figure 2:
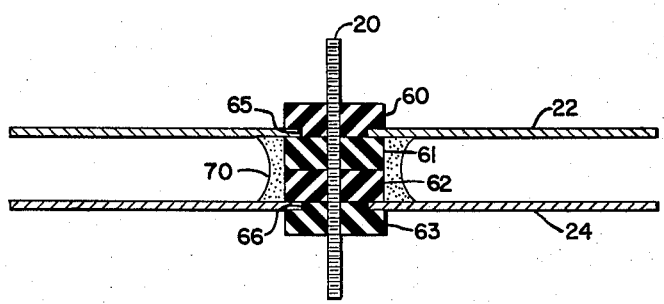
FIGURE 2 is a sectional view of one embodiment of the present invention.

In order that accurate operation of the system is provided under conditions of different temperatures and different kinds of fluid being sensed, it is desirable to have the vertical spacing between the electrodes 22 and 24 at a minimum. The closer the electrodes are together, the less change in fluid level is required to sufficiently change the capacitance of sensor 18 to activate the system. However, the closer the electrodes 22 and 24 approach each other the greater become certain problems such as the adhesion of fluid to the supporting structure between the electrodes, and the deposit of impurities on the supporting structure. This problem can be seen by reference to FIGURE 2 in which the capacitor electrodes 22 and 24 are shown mounted on a supporting rod 20 by means of a plurality of insulators 60, 61, 62 and 63. The insulators 60–63 may be internally threaded so as to mate with the supporting rod 20 and the electrodes 22 and 24 may have a central aperture which fits into grooves 65 and 66 in insulators 60 and 63. Also shown in FIGURE 2 is a small portion of fluid 70 adhering to the insulators 61 and 62 between the electrodes 22 and 24. This fluid may cause inaccurate operation of the system since it may present a finite resistance in parallel with the electrodes. The resistance in parallel with the electrodes 22 and 24 could also be caused by impurities in the fluid slowly building up between the electrodes across the insulators 61 and 62.

Figure 3:
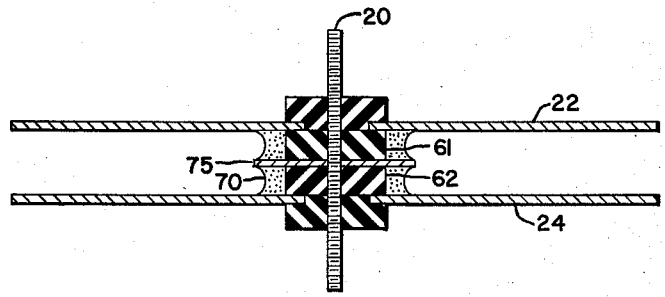
FIGURE 3 is a sectional view of one embodiment of the present invention employing the grounded conductive member.

To overcome the problem presented by impurities or by the adhesion of fluid, a grounded conductor may be utilized as shown in FIGURE 3. The apparatus of FIGURE 3 is identical to that of FIGURE 2 except that a washer-like conductor 75 which may be threaded for connection to the supporting rod 20 is placed between insulators 61 and 62. The washer or conductive member 75 extends beyond the insulators 61 and 62 so that any fluid 70 which adheres to the supporting structure between the electrodes 22 and 24 is split into two parts by the relatively sharp edge of the conductor 75. Since the supporting rod 20 is connected to ground or reference potential, the fluid adhering to the supporting structure in FIGURE 3 is connected between each of the electrodes and ground potential rather than in parallel with the electrodes. The resistance thus formed merely loads the input to the amplifier and the voltage source but does not upset the balance of the feedback bridge. It is desirable to make the conductor 75 as thin as practical for two reasons: first, the thinner the conductor 75, the greater the distance between it and either of the electrodes which minimizes the loading above mentioned, and second, the thinner the conductor 75, the less likelihood there is that the fluid 70 will bubble over the edge to complete a small resistive circuit between electrodes.

It is seen that the capacitive sensor thus far described may be made small, light-weight, is easily fabricated, and comprises a minimum number of parts to assemble. In FIGURES 4–9 various other embodiments of the capacitive sensor are shown, all of which contain these desirable features.

Figure 4:
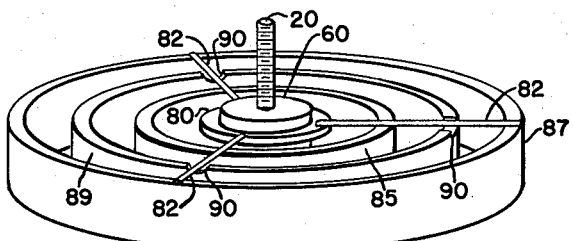
FIGURE 4 is an isometric projection showing the upper portion of a second embodiment of the present invention.
Figure 5:
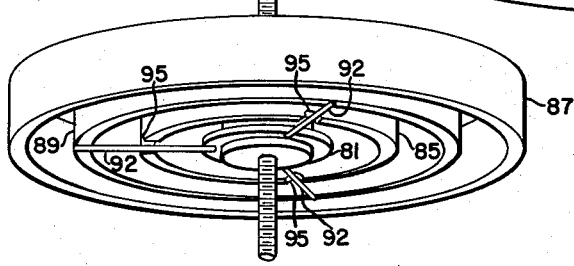
FIGURE 5 is an isometric projection showing the lower portion of the embodiment shown in FIGURE 4.
Figure 6:
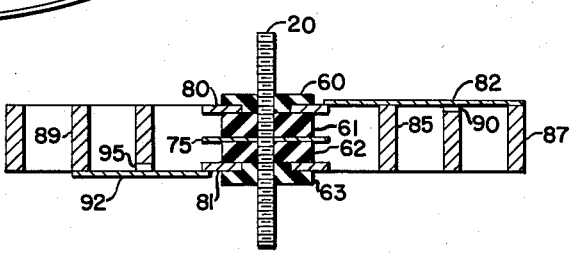
FIGURE 6 is a cross sectional view of the capacitors of FIGURES 4 and 5.

FIGURES 4, 5 and 6 show the electrodes of the level sensing capacitor in the form of cylinders. In these figures the supporting rod 20 supports the insulators 60, 61, 62 and 63 in the same manner as that shown in FIGURES 2 and 3. In this case however, instead of directly supporting the capacitor electrodes the insulators 60 and 63 support washer-like conductors 80 and 81, respectively. The upper conductor 80 extends beyond the insulators 60 and 61 and has attached to it three wires 82 which extend radially outwardly therefrom. In this embodiment three concentrically mounted cylinders are utilized as the capacitive electrodes. The inner cylindrical member 85 and the outer cylindrical member 87 are each connected to the radially extending wires 82. Wires 82 may be connected to the upper conductive member 80 and to cylindrical members 85 and 87 in any convenient manner such as by soldering. The intermediate cylindrical member 89 has a plurality of indentations 90 at spaced points along the upper edge thereof to allow the passage of wires 82 from the cylinder 85 to the cylinder 87 without making electrical contact with the cylinder 89. As best seen in FIGURE 5, the lower conductive member 81 extends beyond the insulators 62 and 63 and also has a plurality of wires 92 attached thereto which extend radially outwardly. The intermediate cylindrical member 89 is attached to the wires 92. A plurality of indentations 95 along the lower edge of inner cylindrical member 85 allow the wires 92 to extend from the lower conductor 81 to the intermediate cylindrical member 89 without making electrical contact with the inner cylindrical member 85. Again as in the previous embodiment a conductive washer 75 is interposed between insulators 61 and 62 to connect any adhering fluid or contaminants existing between the capacitive electrodes to ground.

The cylindrical capacitor arrangement shown in FIGURES 4, 5 and 6 has the advantage that fluid can drain more readily out of the sensor than it can in the embodiment shown in FIGURES 2 and 3. The arrangement shown in FIGURES 4, 5 and 6, however, is somewhat more complicated to construct and occupies slightly larger volume. The vertical height of the cylindrical members 85, 87 and 89 can be made smaller although decreasing the size decreases the capacitance between the members. By increasing the number of electrodes this capacitance can be increased and hence the design of the sensor for use in any particular system is dependent upon the amount of space available, the accuracy requirements and the limits which practical design will allow.

Figure 7:
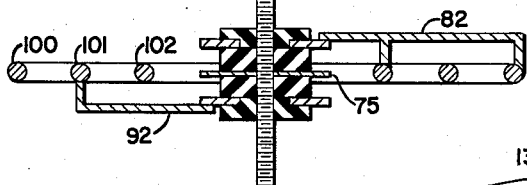
FIGURE 7 is a sectional view of a third embodiment of the present invention.

FIGURE 7 shows an embodiment wherein the vertical height of the cylindrical electrodes are reduced to the point of a standard wire. As shown in FIGURE 7 the capacitive electrodes are formed by wires 100, 101 and 102. The support for the wires is similar to that shown in FIGURES 4, 5 and 6 in that a plurality of radially extending wires 82 are connected to the inner wire 102 and outer wire 100, and a lower plurality of radially extending wires 92 are connected to the intermediate electrode 101. In all other respects the apparatus of FIGURE 7 is the same as that shown in FIGURES 4, 5 and 6, the main advantage of FIGURE 7, besides simplicity and economy, is that a very small vertical displacement is provided which increases the accuracy of the system.

In FIGURES 4, 5, 6 and 7 it should be noted that the sole support for the electrodes is by the wires 82 and 92 connected to the upper and lower conductive members 80 and 81, respectively. Further it should be noted that the only mechanical connection between the electrodes is across the insulators 61 and 62 which form a portion of the central supporting structure and that any contaminants or adhering fluid tending to connect the electrodes of the capacitor must cross the grounded conductive element 75 and hence do not disturb the accuracy of the system.

Figure 8:
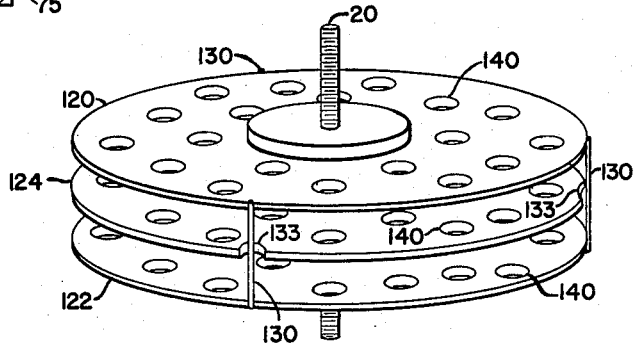
FIGURE 8 is an isometric projection of a fourth embodiment of the present invention; and, FIGURE 9 is a sectional view of the embodiment shown in FIGURE 8.
Figure 9:
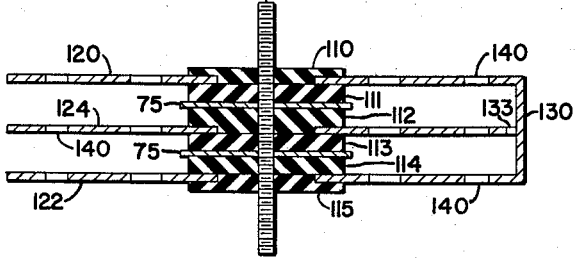

FIGURES 8 and 9 show a further embodiment of the present invention. In these figures the central supporting rod 20 carries a plurality of insulators 110, 111, 112, 113, 114 and 115 in a manner similar to that shown in FIGURES 2 and 3. The upper insulator 110, the lower insulator 115, and the intermediate insulator 112 have peripheral grooves which carry an upper conductive disc 120, a lower conductive disc 122, and an intermediate disc 124, respectively. The upper and lower conductive discs 120 and 122 are joined by a plurality of vertical wires 130 and a plurality of indentations 133 along the edge of the intermediate disc 124 allows the passage of wires 130 from upper to the lower discs without making electrical contact with the intermediate disc 124. Thus, the upper and lower discs are electrically connected and form one electrode of the capacitor sensor while the intermediate disc 124 forms the other electrode.

If the sensor shown in FIGURES 8 and 9 is to be mounted vertically, a plurality of holes 140 may be placed in each of the discs to facilitate the passage of fluid out of the sensor when the level of fluid in the container falls. As in the previous embodiments, washer 75 is placed between insulators connected to each of the electrodes so that contaminants or adhering fluid are connected to ground.

When the support rod 20 is threaded, the exact level at which the capacitor is to be located may be set by twisting the rod 20 in the support structure 15 or by twisting the sensor 18 on the rod 20. Vernier adjustment is thus provided after which the structure may be permanently fixed as, for example, with clamping nuts or by welding. Electrical connections to the electrodes may be made in any convenient manner and have not been shown in the drawings for simplicity.

It has been shown that a light-weight, inexpensive, small and easily fabricated capacitive sensor has been provided. It is further seen that precautions have been taken to prevent adhering fluid or contaminants from disturbing the system in which the sensor is used. It is realized that many modifications will occur to those skilled in the art and I do not wish to be limited by the specific embodiments herein disclosed. I intend only to be limited by the appended claims.

I claim as my invention:

1. A fluid level sensing system comprising, in combination: a source of voltage having first and second end terminals and an intermediate terminal connected to a point of reference potential; an amplifier having an input and an output; means connecting the output of said amplifier to energize said voltage source; a first capacitor connected between the first terminal of said voltage source and the input of said amplifier; a level sensing capacitor adapted to be mounted in a container of fluid at a predetermined level, said sensing capacitor comprising a support rod connected to the point of reference potential, a first capacitor plate connected to the second end terminal of said voltage source, first insulative means mounting said first capacitor plate to said rod, a second capacitor plate connected to the input of said amplifier, second insulative means mounting said second capacitor plate on said rod, and conductive means mounted on said rod intermediate and extending beyond said first and second insulative means so that any contaminants building up along said insulative means between said first and second capacitor plates must cross said conductive means.

2. A fluid level sensing capacitor comprising, in combination: a conductive supporting rod; a first cylindrical capacitor plate; a first plurality of conductive wires connected to said first cylindrical capacitor plate and extending inwardly; first insulative means connected to said rod; first conductive means connected to said first insulative means and to said first plurality of wires so that said first cylindrical capacitor plate is carried by but insulated from said supporting rod; a second cylindrical capacitor plate; a second plurality of conductive wires connected to said second cylindrical capacitor plate and extending inwardly; second insulative means connected to said rod; second conductive means connected to said second insulative means and to said second plurality of wires so that said second cylindrical capacitor plate is carried by said supporting rod in concentric relation to said first cylindrical capacitor plate; and third conductive means connected to said rod and interposed between said first and second insulative means so that any path between said first and second cylindrical capacitor plates across said first and second insulative means must cross said third conductive means.

3. A fluid level sensing capacitor comprising, in combination: an elongated central supporting rod; first insulator means connected to said rod; first conductor means connected to said first insulator means and insulated from said rod; a first plurality of radially extending conductive wires connected to said first conductor means; a first conductive cylinder having a first diameter connected to said first plurality of wires; a second conductive cylinder having a second diameter larger than the first diameter connected to said first plurality of wires so as to be in concentric relation with said first conductive cylinder, said first plurality of wires being the only support for said first and second conductive cylinders; second insulator means connected to said rod and longitudinally displaced from said first insulator means; second conductor means connected to said second insulator means and insulated from said rod and from said first conductor means; a second plurality of radially extending conductive wires connected to said second conductor means; a third conductive cylinder having a third diameter intermediate the first and second diameters connected to said second plurality of wires so as to be in concentric relation to said first and second conductive cylinder, said second plurality of wires being the only support for said third conductive cylinder; and third conductive means electrically and mechanically connected to said rod at a position intermediate said first and second insulator means.

4. A fluid level sensing capacitor comprising, in combination: an elongated central supporting rod; first insulator means connected to said rod; first conductor means connected to said first insulator means, and insulated from said rod; a first plurality of radially extending conductive wires connected to said first conductor means; a first conductive cylinder having a first diameter connected to said first plurality of wires; said first plurality of wires being the only support for said first conductive cylinder; second insulator means connected to said rod and longitudinally displaced from said first insulator means; second conductor means connected to said second insulator means and insulated from said rod and from said first conductor means; a second plurality of radially extending conductive wires connected to said second conductor means; a second conductive cylinder having a second diameter larger than the first diameter connected to said second plurality of wires so as to be in concentric relation to said first conductive cylinder, said second plurality of wires being the only support for said second conductive cylinder; and third conductive means electrically and mechanically connected to said rod at a position intermediate said first and second insulator means.

5. A sensing capacitor for use in a fluid level sensing system comprising, in combination: a first wire in the form of a circular capacitor electrode; a second wire in the form of a circular capacitor electrode; an elongated internal conductive mounting rod; first insulative means attached to said rod; first conductive means attached to said first insulative means and insulated from said rod, said first conductive means attached to support said first circular capacitor electrode; second insulative means attached to said rod; and second conductive means attached to said second insulative means and insulated from said rod, said second conductive means being adapted to support said second circular capacitor electrode in concentric relation to said first circular capacitor electrode.

6. A fluid level sensing capacitor comprising, in combination: a plurality of disc shaped capacitor plates each having an aperture therethrough; insulative means connected in the aperture of each plate; a first electrical conductor connected only to each alternate capacitor plate; a second electrical conductor connected only to the remaining capacitor plates; a central conductive supporting rod connected to said insulative means so that said capacitor plates are carried by said supporting rod; and conductive means connected to said rod and mounted between each pair of capacitor plates so that any path joining said capacitor plates across said insulative means must cross and contact said conductive means, said conductive means being of a smaller area than said plates.

7. Apparatus of the class described comprising, in combination: an elongated conductive rod; first insulative means connected to said rod; a first disc shaped conductor of a predetermined area having an aperture therethrough, said first insulative means fitting in the aperture of said first conductor so that said first conductor is carried by but insulated from said rod; second insulative means connected to said rod; a second disc shaped conductor having an aperture therethrough, said second insulative means fitting in the aperture of said second conductor so that said second conductor is carried by but insulated from said rod; and conductive means connected to said rod intermediate said first and second insulative means so that any path between said first and second conductor along said first and second insulative means crosses and contacts said conductive means, said conductive means being of a smaller area than said first disc shaped conductor.

8. A fluid level sensing capacitor for use with a container of fluid comprising, in combination: a plurality of capacitor plates each having a predetermined area; means mounting said plates in the container at a predetermined level comprising a conductive support member, first insulative means connected to said support member and to a first of said capacitor plates to position the first of said capacitor plates with respect to said support member and to prevent conduction therebetween; second insulative means connected to said support member and to a second of said capacitor plates to position the second of said capacitor plates with respect to said support member and to prevent conduction therebetween; conductive means electrically connected to said support member and interposed between said first and second insulative means, said first and second insulative means and said conductive means forming the only mechanical path between the first and the second of said capacitor plates, and said conductive means being interposed between part of the area of said plates.

9. Apparatus of the class described comprising, in combination: an elongated conductive central supporting rod; first capacitor plate means having a predetermined area; first insulative means mounting said first capacitor plate means on said rod; second capacitor plate means; second insulative means mounting said second capacitor plate means on said rod so that the only mechanical connection between said first and second capacitor plate means includes said rod and said first and second insulative means; and conductive means mounted on said rod intermediate said first and second insulative means so that any path between said first and second capacitor plate means along said first and second insulative means must cross said conductive means, said conductive means being of a smaller area than the area of said first capacitor plate.

10. A fluid level sensing capacitor for use in a fluid level switching circuit wherein the vertical displacement of the capacitor plates is small with respect to the depth of the container of fluid being sensed comprising, in combination: a central conductive supporting rod adapted to be connected in the container; first and second insulator means connected to said rod; first and second substantially circular capacitive electrodes of given diameters, said capacitive electrodes being supported only by said first and second insulator means respectively and spaced with respect to each other so that the fluid in the container may rise and fall between the electrodes, the fluid having a tendency to adhere to a structural path between said conductors along the support formed by said first and second insulator means; and means preventing any adhering fluid from electrically connecting said first and second electrodes directly along the structural path, the last named means comprising a conductive element electrically connected to said rod and mounted between said first and second insulator means so as to form a part of the structural path between said electrodes, and said conductive element being of a smaller diameter than said first electrode.

11. Supporting structure for a fluid level sensing capacitor comprising, in combination: an elongated rod; first insulator means attached to and surrounding said rod at a first position, said first insulator means adapted to support a first capacitor electrode of a predetermined size; second insulator means attached to and surrounding said rod at a second position, said second insulator means adapted to support a second capacitor electrode in a predetermined position with respect to said first electrode; and a thin abutting conductor interposed between said first and second insulator means and connected to said rod, said conductor having an edge extending radially outwardly beyond said first and second insulator means to split and contact any fluid which tends to adhere to said first and second insulator means by surface tension and said abutting conductor being of a smaller size than said first capacitor electrode.

12. Supporting structure for a fluid level sensing capacitor comprising, in combination: first capacitive plate means; conductive supporting structure means; second capacitive plate means; insulative means mounted on said supporting structure means and adapted to support said first and second capacitive plate means, to insulate said first and second plate means from said structure means and to insulate said first plate means from said second plate means; and conductive means connected to said supporting structure means, said conductive means being supported by said supporting structure means and being positioned intermediate said first and second capacitive plate means, and said conductive means being adapted to extend beyond said insulative means only a short distance relative to said first and second capacitive plate means.

13. Supporting structure for a fluid level sensing capacitor comprising, in combination: first capacitive plate means; conductive supporting structure means; second capacitive plate means; insulative means mounted on said supporting structure means and adapted to support said first and second capacitive plate means and to insulate said first and second plate means from said structure means and to insulate said first plate means from said second plate means; and conductive means connected to said supporting structure means, said conductive means being supported by said supporting structure means and being positioned intermediate said first and second capacitive plate means, and said conductive means being of a smaller area than the area of said capacitive plate means.

References Cited in the file of this patent

UNITED STATES PATENTS

| | | |
|---|---|---|
| 867,579 | Gerard | Oct. 8, 1907 |
| 2,435,880 | Eilenberger | Feb. 10, 1948 |
| 2,714,939 | Richardson | Aug. 9, 1955 |
| 2,718,620 | Howe | Sept. 20, 1955 |
| 2,751,531 | Barrett | June 19, 1956 |
| 2,787,783 | Storm | Apr. 2, 1957 |
| 2,908,166 | Johnson | Oct. 13, 1959 |
| 2,926,749 | Oswald | Mar. 11, 1960 |
| 2,945,165 | Franzel | July 12, 1960 |

FOREIGN PATENTS

| | | |
|---|---|---|
| 455,731 | Canada | Apr. 5, 1949 |
| 815,449 | Great Britain | June 24, 1959 |